July 28, 1970   F. J. CALLAHAN, JR., ET AL   3,521,910
TUBE COUPLING
Filed Nov. 12, 1968
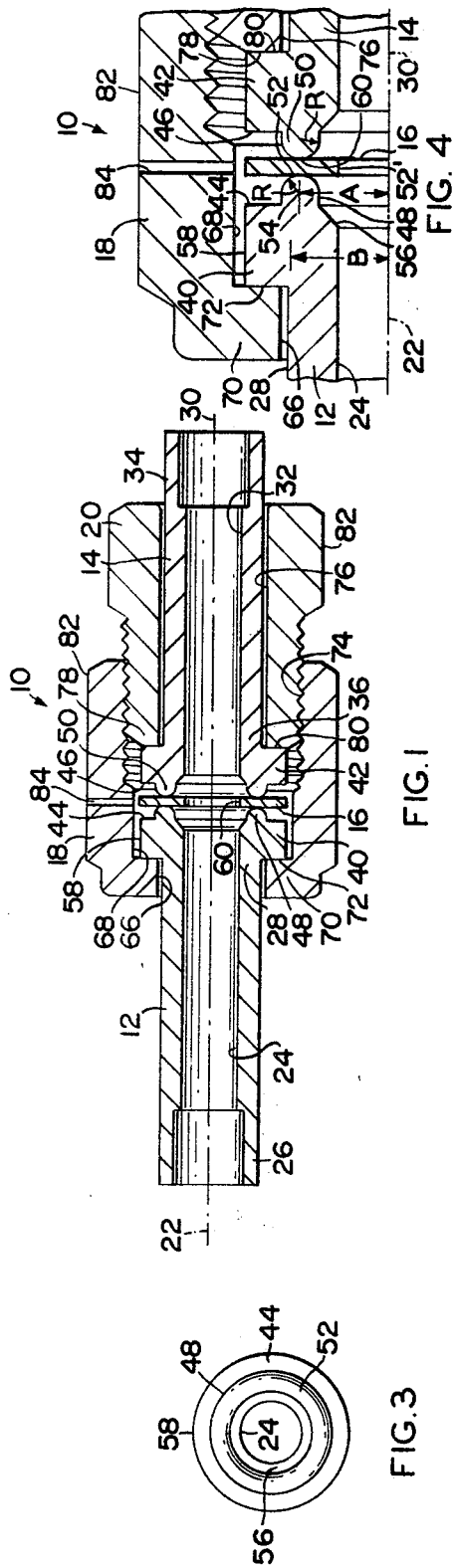
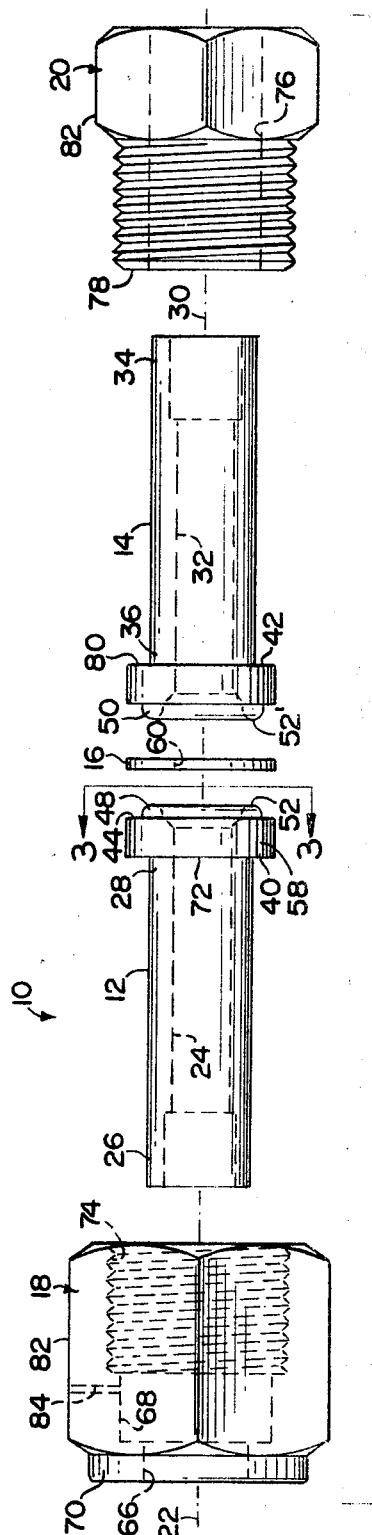
INVENTORS
FRANCIS J. CALLAHAN JR.
ERLING G. WENNERSTROM
BY
Fay, Sharpe & Mulholland
ATTORNEYS.

United States Patent Office 3,521,910
Patented July 28, 1970

3,521,910
TUBE COUPLING
Francis J. Callahan, Jr., Chagrin Falls, and Erling G. Wennerstrom, Mayfield, Ohio, assignors to Cajon Company, Solon, Ohio, a corporation of Ohio
Filed Nov. 12, 1968, Ser. No. 775,017
Int. Cl. F16l 55/00
U.S. Cl. 285—14                                7 Claims

ABSTRACT OF THE DISCLOSURE

Disclosed is a coupling suitable for use on both pressure and vacuum applications. The coupling comprises a pair of coupling components each having a bore, an axis, a first end and a second end. The first end of each of the components is adapted to be secured to a fluid line. The second end of each component includes a radially extending flange having an end face. A generally annular rib, semicircular in cross section, extends from the end face of each such flange. The coupling components are adapted to be disposed in end-to-end relationship with the rib of one component opposed to that of the other. A generally annular sealing gasket is disposed between the ribs, and a coupling nut and gland nut cooperate to draw the respective flanges together whereby the ribs of each of the components are brought into sealing engagement with the gasket.

BACKGROUND OF THE INVENTION

This invention relates to a tube coupling and more particularly to a tube coupling suitable for use on both pressure and vacuum applications.

There are available a wide variety of tube couplings designed for use with both high and low temperatures and high pressure and vacuum. A prospective user simply has to determine his particular requirements and select a suitable coupling from a large range of designs or styles commercially available.

Thus, if a prospective user has a requirement for a high temperature vacuum coupling designed for use at bake-out temperatures, he would select a coupling employing a metal gasket rather than one of organic material susceptible to deterioration at these temperatures. Where the prospective user has a requirement for a vacuum coupling for use in low temperature application, he would probably select a coupling employing an O-ring seal comprised of a suitable elastomeric material such as Viton A. Should the prospective user have a requirement for a high pressure application in a tube coupling, he will probably select some appropriate third design to meet this requirement.

Similarly, if the application for which the coupling is intended should require the use of a particular material, such as stainless steel or brass, the user will have to evaluate still further designs of tube couplings in order to find a manufacturer who supplies tube coupling components manufactured from the particular material or materials desired.

It is not uncommon, therefore, that the prospective user of a tube coupling must resort to a variety of designs and sources of manufacture in order to satisfy his full range of requirements. This would not initially appear to be a problem, since there are a wide variety of coupling designs and manufacturers of tube couplings from which to choose. However, once the user installs several designs of tube couplings from several sources of manufacture he finds that he must maintain a rather elaborate inventory of coupling parts for replacement purposes.

Thus, where a user has installed many tube couplings for both vacuum and pressure applications as well as low and high temperature applications, it is not uncommon that his parts inventory will comprise several hundred pieces including gaskets, coupling bodies, nuts, and other elements unique to the particular designs of couplings in service.

The problem presented by the prior art, therefore, is one of economy as well as flexibility. Where a prospective user has both vacuum and pressure requirements for a tube coupling at both low and high temperatures, the initial investment in a wide variety of coupling designs from one or several sources of manufacture will often be more than equaled by the investment in a suitable inventory of replacement parts for the various tube couplings. These parts are normally not interchangeable and the user finds that he has little flexibility in that he cannot "piece together" a tube coupling from a variety of parts from different sources of manufacture. Moreover, there is the added problem that should incompatible parts be interchanged through accident or ignorance, a dangerous malfunction may result.

This invention provides a coupling suitable for use on both ultra-high vacuum applications as well as pressure applications. It is also ideally suited for temperature cycling and cryogenics.

This invention further provides a tube coupling wherein the sealing gasket thereof may be fabricated from a variety of materials, both metallic and nonmetallic, thus rendering the coupling suitable for use in a wide range of temperatures including bake-out temperatures.

BRIEF SUMMARY OF THE INVENTION

Briefly described, this invention relates to a tube coupling comprising a pair of coupling components, each component having a bore, an axis, a first end and a second end. The first end of each of the components is adapted to be secured to a fluid line.

The second end of each component includes a radially extending flange having an end face. A generally annular rib extends from the end face of each coupling component and includes a sealing surface defined by a radius. The coupling components are adapted to be disposed in end-to-end relationship with the sealing surfaces of the ribs in opposition to one another, and with a generally annular sealing gasket disposed between them.

A coupling nut and a gland nut cooperate with respective flanges of the components to draw the flanges together as the coupling is made-up. The sealing surfaces of the ribs are thereupon brought into sealing engagement with opposite faces of the gasket.

DESCRIPTION OF THE DRAWINGS

In the drawings wherein like reference numerals indicate like parts in the various views:

FIG. 1 is a longitudinal cross-sectional view of the coupling of this invention in a fully made-up condition;

FIG. 2 is an exploded elevational view of the various elements of the coupling of this invention;

FIG. 3 is an end elevational view of one of the coupling components taken along the line 3—3 of FIG. 2;

FIG. 4 is an enlarged cross-sectional view of the sealing interfaces at the gasket of the coupling of this invention.

DETAILED DESCRIPTION OF THE INVENTION

Referring initially to FIG. 1, there is shown a longitudinal cross-sectional view of a coupling embodying the principles of this invention. The coupling, generally indicated at 10, is pictured in the fully made-up condition, and is comprised of a first coupling component 12, a second coupling component 14, a sealing gasket 16, a coupling nut 18, and a gland nut 20.

Each of the respective elements of the coupling 10 of this invention will now be described in detail.

In the preferred embodiment of this invention as shown in FIG. 1, the coupling components 12 and 14 are identical. Coupling component 12 includes an axis 22, a bore 24, a first end 26 and a second end 28.

Similarly, the second coupling component 14 of FIG. 1 includes an axis 30, a bore 32, a first end 34 and a second end 36.

The first ends 26, 34 of the respective coupling components 12, 14 are provided with suitable means for attachment to a fluid line (not shown), such as socket weld type coupling devices adapted to be secured to the line by means of welding or brazing. Similarly, within the scope of this invention should be considered other connection means for securing the respective first ends 26, 34 to a fluid line such as threaded connection means, ferrule type tube couplings and other couplings well known to those skilled in the art.

At the respective second ends 28, 36 of each of the coupling components there are provided generally radially extending flanges 40, 42 having end faces 44, 46 disposed generally transverse to the respective axes 22, 30.

Extending axially from end faces 44, 46, respectively, are ribs 48, 50.

As shown in the enlarged cross-sectional view of FIG. 4, rib 48 includes a sealing surface 52 defined by a radius R drawn from a point of origin 54. As is evident from FIG. 4, rib 48 is generally semicircular in cross section with a sealing surface 52 extending throughout a segment approximately 180° in magnitude.

In the preferred embodiment of this invention, the distance A from the point of origin 54 to the axis 22 is less than the distance B from the midpoint of flange 40 (as measured in a transverse plane) and axis 22. Stated another way, the point of origin 54 of the radius R is closer to the wall defining bore 24 than to the peripheral surface 58 of flange 40. The purpose of this particular relationship of the preferred embodiment will become more apparent hereinafter.

The description of rib 48 of coupling component 12 applies also to rib 50 of coupling component 14. It should be understood that in every substantial respect the coupling components 12, 14 are identical in the preferred embodiment of this invention. Thus, the rib 50 of coupling component 14 includes an external sealing surface 52' defined by a radius R.

As is shown in FIG. 4, the inner portion of rib 48 is interconnected with the wall defining bore 24 by means of frusto-conical surface 56. Also within the scope of this invention should be considered a generally transverse surface providing an interconnection between the rib and the wall defining bore 24 which surface may generally take the form of an extension of end face 44.

As seen in FIG. 1, the coupling components 12, 14 are adapted to be disposed in end-to-end relation with the respective ribs 48, 50 in opposition to one another. A generally annular sealing gasket 16 is disposed between the sealing surfaces 52, 52' of ribs 48, 50 and coacts with these surfaces in order to provide a fluid-tight coupling.

Sealing gasket 16 is defined by a bore or aperture 60 (FIG. 2) having a diameter substantially equal to the diameter of bores 24, 32. The outside diameter of sealing gasket 16 is approximately equal to the outside diameter of flanges 40, 42 for a purpose to be pointed out more fully hereafter. However, within the scope of this invention, the outside diameter of sealing gasket 16 may vary somewhat so long as it is sufficiently large as to be sealingly engaged by the ribs.

In the preferred embodiment of this invention the respective sealing surfaces 52, 52' of ribs 48, 50 are polished in order to enhance the sealing characteristics of the coupling. Moreover, it is normally preferred that the radius R defining the respective sealing surfaces 52, 52' be sufficiently large that the sealing surfaces do not bite or cut into the sealing gasket particularly in those cases where the gasket is of nonmetallic construction. The resulting tangential contact with the gasket produces at most a slight indentation in the gasket surface with the coupling fully made-up.

Coupling means for the components and the sealing gasket are provided in the form of coupling nut 18 and gland nut 20.

Coupling nut 18 includes a bore 66 and a counterbore 68. Bore 66 is slightly larger than the outside diameter of coupling component 12 to enable the coupling nut to be disposed about the coupling component. Counterbore 68, similarly, is slightly larger than the outside diameter of flanges 40, 42 to enable the coupling nut to be disposed about the flanges. Bore 66 and counterbore 68 define an inturned flange 70 for the purpose of coacting with a face 72 (FIG. 2) of flange 40 as shown in FIGS. 1 and 2. Internal threads 74 are provided in coupling nut 18 for the purpose of receiving gland nut 20.

Gland nut 20 includes a bore 76 slightly larger than the external diameter of coupling component 14 to enable the gland nut to be disposed about the component. The inner end 78 (FIG. 2) of gland nut 20 is generally square and defines a driving face for the purpose of coacting with face 80 of flange 42.

To assist in the make-up of the coupling of this invention, tool pads 82 may be provided on the external surface of gland nut 20 and coupling nut 18.

As may be seen from FIG. 1, counterbore 68 of coupling nut 18 has a diameter only slightly larger than the outside diameter of flanges 40, 42 and the outside diameter of sealing gasket 16 thereby to promote centering of the flanges and sealing gasket within the coupling nut and alignment of the respective axes 22, 30 of the components and the axis of the gasket.

Assembly of the tube coupling of this invention will now be described with reference to FIGS. 1 and 2. Initially, the coupling nut 18 is advanced along the coupling component 12 until inturned flange 70 abuts face 72 of flange 40. With the coupling component 12 and the coupling nut 18 assembled in this position, the sealing gasket 16 may thereafter be deposited within the coupling nut to engage the rib 48. Since the outside diameter of sealing gasket 16 is only slightly less than the diameter of counterbore 68 of the coupling nut, the sealing gasket will be automatically centered with respect to axis 22 of coupling component 12 to insure that rib 48 engages the sealing gasket throughout a full 360°.

The sealing gasket having been disposed within the coupling nut 18, the second coupling component 14 is thereafter positioned within the coupling nut. Make-up of the coupling is completed by advancing the gland nut 20 over the coupling component 12 and thereafter threading the gland nut 20 into the coupling nut until the inner end 78 of the gland nut contacts face 80 of flange 42. Additional turning of the gland nut will draw flanges 40, 42 together thereby bringing ribs 48, 50 into sealing engagement with the sealing gasket 16. The degree to which the gland nut 20 is tightened will vary depending upon the materials of construction selected for the coupling components and the sealing gasket.

As shown in FIG. 1, a special port 84 is provided in the coupling nut 18 for testing the integrity of the seal such as by helium leak-test techniques. It will be noted from FIG. 1 that port 84 is positioned so as to overlie the sealing gasket 16 when the coupling is fully made-up. In conducting a helium leak test, a vacuum is first drawn in the coupling. Helium gas under pressure is then sprayed through port 84 using a suitable probe. A sensitive helium detector such as a mass spectrometer is attached in communication with the interior of the coupling to sense the presence of helium molecules which may have been drawn past the seal into the interior of the coupling.

MATERIALS OF CONSTRUCTION

In the preferred form of this invention as shown in FIG. 1 the coupling components 12, 14, the coupling nut 18 and the gland nut 20 are manufactured from type 316 stainless steel. The sealing gasket 18 is manufactured from high purity nickel and is lapped to enhance sealing. The sealing surfaces 52, 52' of the respective ribs 48, 50 are polished. Since the sealing gasket 16 of this invention is readily removable from the coupling, sealing gaskets manufactured from various materials such as alumiuum, copper and Teflon may be readily substituted for the nickel gasket of the preferred embodiment of this invention.

In addition to the variety of materials that may be employed in the sealing gasket 16, the coupling components themselves may be manufactured from a variety of materials to suit a particular need. For instance, in order to equalize expansion or contraction of the various elements of a fluid line it may be desirable to manufacture the coupling components from the same material used in the fluid system. As an example, the coupling components, gland nut and coupling nut may be manufactured from a variety of stainless steels, copper alloys, aluminum, Monel, or even plastic and glass.

ADVANTAGES OF THE INVENTION

Several features of the coupling of this invention will now be described as an aid to understanding the full scope of the invention.

The coupling is suitable for use on both ultra-high vacuum and pressure applications. In this connection, the device has been tested leak free on a vacuum application at a sensitivity of .0004 micron cu. ft. per hr. On a pressure application the coupling of this invention has been tested at pressures from 2300 to 9800 p.s.i.

Depending upon the particular gasket material selected, the coupling may be utilized in a wide variety of temperature applications from very low temperatures to bake-out temperatures.

Due to the relationship of the ribs 48, 50 to the flanges 40, 42, there is a minimum dead space in the coupling. Where a coupling is to be utilized in a system that must be periodically purged, it is important that dead space be minimized in order to reduce the build-up of contaminates that may not be readily purged from the system during pump down or bake-out. Since the ribs 48, 50 of the coupling components are located relatively close to the walls defining the respective bores 24, 32 of the coupling components, the amount of dead space in the vicinity of the sealing gasket has thus been minimized.

Another feature of the coupling is the provision of the port 84 in the coupling nut 18 for the purpose of conducting a helium leak test. The relationship of the coupling nut 18 to the sealing gasket 16 permits direct access to the sealing interface of the ribs and the gasket by means of the port 84 when it is desired to conduct a leak test.

An added feature of the tube coupling of this invention is the use of a pair of identical coupling components 12, 14 which are adapted to be secured to fluid lines. As previously noted, the coupling components 12, 14 may be manufactured from a variety of materials. Since they are readily interchangeable, the user thus has great flexibility in the selection of coupling materials to suit his particular requirements.

It should be noted that the coaction of the coupling components 12, 14, coupling nut 18 and gland nut 20 permits disassembly of the coupling without axial movement of the coupling components. Thus, the unthreading of the gland nut 20 from the coupling nut 18 will permit disassembly of the coupling without the necessity of axial movement of either of the coupling components 12, 14. If an instrument is to be inserted in a fluid line, this coupling may be used at either end of the instrument to permit the instrument to be lifted into and out of the fluid system without the necessity of axial displacement of any parts of the fluid system.

MODIFICATIONS OF THE INVENTION

Several modifications of the coupling of this invention are contemplated and should be considered within the scope of the invention. In the preferred embodiment of the invention, the coupling nut 18 and gland nut 20 cooperate to provide coupling components 12, 14. In other embodiments, the coupling nut 18 could be provided with external threads and the gland nut 20 could be provided with internal threads. Alternately, external threads could be provided on one or both of the flanges 40, 42 to ccooperate with the coupling nut 18 in order to draw the respective coupling components together.

While in the preferred embodiment of this invention as shown in FIG. 1 the flanges 40, 42 are located adjacent the second ends 28, 36 of the respective coupling components, the flanges 40, 42 could be positioned at various locations on the external surface of the respective coupling components with the ribs 48, 50 defined on the end surfaces of the coupling components.

As has been previously pointed out, the respective first ends 26, 34 of the coupling components have been provided with a tube socket in the preferred embodiment of this invention for welding or brazing the coupling components into a fluid system. Within the scope of this invention should be considered other coupling means for securing the respective first ends of the components to a fluid line. Such alternate means could take the form of threaded connectors, ferrule type fittings, or other securing means well known to those skilled in the art.

For ease of description, the principles of the invention have been set forth in connection with but a single illustrated embodiment. It is not our intention that the illustrated embodiment nor the terminology employed in describing it be limiting inasmuch as variations in these may be made without departing from the spirit of the invention. Rather, we desire to be restricted only by the scope of the appended claims.

The invention claimed is:
1. A coupling comprising:
first and second coupling components, each component having a bore, an axis, a first end and a second end;
said first end of each coupling component being adapted to be secured to a fluid line;
said second end of each component including a radially extending face generally transverse to said axis and a generally annular rib extending from said face;
each said rib having a sealing surface defined by a radius;
said sealing surface being substantially free of tool marks and surface imperfections;
said first and second components adapted to be disposed in end-to-end relationship with said sealing surfaces opposed to one another;
a generally annular sealing gasket disposed between said sealing surfaces;
said sealing gasket having sealing surfaces substantially free of tool marks and surface imperfections;
said gasket having a thickness not substantially in excess of said radius;
means to couple said components together whereby said sealing surfaces are brought into sealing engagement with said gasket;
said ribs and said gasket being defined by materials having similar values of hardness such that upon take-up of the coupling said ribs will produce at most a slight indentation in the gasket sealing surfaces.

2. The coupling of claim 1 wherein said means to couple said components together is further defined as a radially extending flange on each of said first and second components, a coupling nut having a bore, a counterbore, an inturned flange adapted to contact the flange of one of said components, and a gland nut adapted to be threadedly received within said coupling nut and coact with the flange of the other of said components.

3. The coupling of claim 2 wherein a leak-test port is provided in said coupling nut adjacent said gasket whereby communication is provided from the sealing interfaces of said sealing surfaces and said gasket to atmosphere.

4. The coupling of claim 1 wherein each said rib is approximately semicircular in cross section being defined by a sealing surface extending throughout a segment approximately 180° in magnitude.

5. The coupling of claim 1 wherein said rib sealing surfaces are polished and said gasket sealing surfaces are lapped.

6. The coupling of claim 1 wherein said gasket is nickel and said ribs are stainless steel.

7. A coupling comprising:
first and second generally annular coupling components, each component having an axis, a component inside diameter, a component outside diameter, a first end and a second end;
each said first end adapted to be secured to a fluid line;
each said second end including a radially extending flange having an end face disposed generally transverse to said axis and a generally annular rib extending from said face;
each said rib having a polished sealing surface defined by a radius;
the distance from the point of origin of said radius to said axis being less than the distance from said axis to the midpoint of said flange as measured in a transverse plane;
said first and second components adapted to be disposed in end-to-end relation with the sealing surfaces of the ribs in opposition to one another;
a generally annular sealing gasket disposed between said sealing surfaces, said sealing gasket having an inside diameter approximately equal to the component inside diameter and an outside diameter greater than the diameter of the circle around which said ribs sealingly engage said gasket;
said sealing gasket having lapped sealing surfaces;
said gasket having a thickness not substantially in excess of said radius;
means to couple said components together whereby said sealing surfaces of said ribs are brought into sealing engagement with said gasket;
said ribs and said gasket being defined by materials having similar values of hardness such that upon take-up of the coupling said ribs will produce at most a slight indentation in the gasket sealing surfaces.

References Cited

UNITED STATES PATENTS

| | | |
|---|---|---|
| 1,834,581 | 12/1931 | Ferrell et al. |
| 2,255,634 | 9/1941 | Walsh _____ 285—331 |
| 2,528,665 | 11/1950 | Peterson et al. |
| 3,098,662 | 7/1963 | Iversen. |
| 3,208,758 | 9/1965 | Carlson et al. _____ 277—236 X |
| 3,428,337 | 2/1969 | Read _____ 285—331 X |

FOREIGN PATENTS

| | | |
|---|---|---|
| 1,059,317 | 11/1953 | France. |
| 1,033 | 1871 | Great Britain. |

DAVE W. AROLA, Primary Examiner

U.S. Cl. X.R.

285—328, 353, 422